United States Patent Office 2,908,703
Patented Oct. 13, 1959

2,908,703
PREPARATION OF AROMATIC ISOCYANATES

Harold K. Latourette, South Charleston, W. Va., and Oscar H. Johnson, Medina, N.Y.

No Drawing. Application August 16, 1955
Serial No. 528,846

13 Claims. (Cl. 260—453)

This invention relates to the preparation of aromatic isocyanates. More particularly, it relates to processes in which aromatic isocyanates are prepared by the reaction of phosgene with the aromatic amine corresponding thereto, in an inert organic diluent.

It is well known in the art to prepare isocyanates from amines by reacting them with phosgene. The reaction may be represented as:

(1)

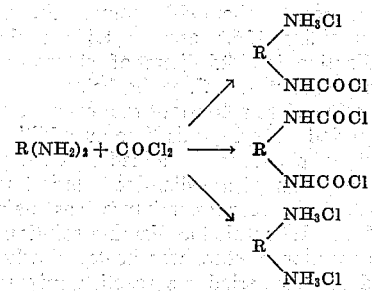

These intermediates may be present in varying proportions, and react further as follows:

(2)

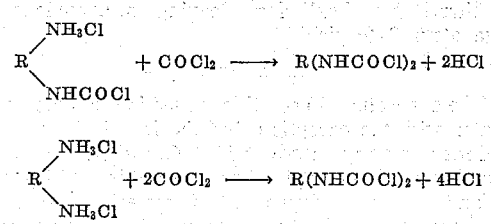

(3)

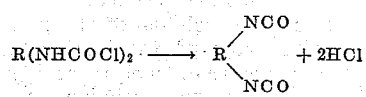

in which R is an aromatic radical.

The isocyanate and intermediate carbamyl chloride which are formed may react with some of the starting amine to give substituted ureas and polyureas, thus decreasing the yield of isocyanate product. To avoid the formation of these side products several improvements in the phosgene preparation of isocyanates have been proposed.

One prior art method calls for a two stage process. The first stage entails the formation of a slurry of intermediates at temperatures ranging from 0° C. to room temperature and subsequently reacting the intermediate products with phosgene at temperatures high enough to convert the intermediate to the isocyanate, usually in the range of 160° to 210° C.

The disadvantages of this prior art process are several. When employing low temperatures during the initial phosgenation, the release of copious amounts of phosgene during the elevation of the temperature to the final phosgenation stage presents a considerable handling problem. This problem is further magnified when one considers the high toxicity of phosgene.

Another disadvantage of the low temperatures method is the inherent slower rate of reaction with resulting longer time cycle. When a molecule of amine is reacted with phosgene, hydrochloric acid is one of the reaction products. Due to the high solubility of hydrochloric acid at low temperatures, the hydrochloric acid will combine with a molecule of amine to form amine hydrochloride. At low temperatures the reaction between the amine hydrochloride and phosgene doesn't occur to any appreciable extent. Furthermore the conversion of the intermediate carbamyl chloride to the isocyanate will not occur at the lower temperatures of the prior art. It requires higher temperatures to release the hydrochloric acid and free the amine for further reaction with phosgene and likewise higher temperatures to effect the conversion of intermediate product to isocyanate.

It has also been proposed to carry out the reaction between the amine and phosgene at an initial temperature of phosgenation higher than the preferred temperature range of this invention. We have found that the employment of temperatures higher than our preferred range during the initial phosgenation results in a substantial decrease in the yield of product.

An object of this invention is to provide an improved liquid phase process for the preparation of aromatic isocyanates.

A further object of this invention is to provide an improved process that overcomes the above-recited disadvantages of prior art methods. Further objects will appear as the discussion of this invention proceeds.

We have discovered that an optimum temperature range exists for the primary phosgenation of aromatic amines whereby the disadvantages of the teachings of the prior art are overcome.

We have found that if the aromatic amine is initially phosgenated at a temperature between 60° C. and 90° C. that the preparation of aromatic isocyanates is facilitated. By conducting the initial phosgenation of the aromatic amine at this temperature an accelerated rate of reaction is had. Whereas, with low temperature phosgenation the conversion of amine hydrochloride and carbamyl chloride to carbamyl chloride and isocyanate product, respectively, does not occur to any appreciable extent, at our critical temperature range appreciable quantities of isocyanate form.

Furthermore, when the initial phosgenation is carried out in the range of 60° C. to 90° C., an intermediate reaction product is formed which has the proper physical properties so as to be better adapted to further processing.

Finally, by operating at our initial high temperature the handling problems and consequent safety hazards, brought about by the release of phosgene from solution during the intentional or accidental elevation of the temperature, are avoided.

According to our invention, phosgene and an inert organic solvent solution of a primary aromatic amine are reacted together, initially at a temperature between about 60° C. and about 90° C. and subsequently at a temperature sufficiently high to convert the intermediary product to the isocyanate.

In a representative embodiment of this invention, a dilute solution of the aromatic amine in an inert organic solvent, such as chlorobenzene, is passed into the first reactor where it is heated to the preferred temperature for initial phosgenation. Concomitant with the addition of amine solution to the first reactor, phosgene gas from any convenient source is admitted to the solvent until a saturated solution is obtained.

The mass in the reaction vessel is preferably well agitated and sufficient heat is supplied to maintain the preferred temperature for initial phosgenation. Preferably, the solution of the amine and the phosgene are introduced at such rates that there is at least a 50% stoichiometric excess of phosgene over that theoretically required to react with the amine.

When all the amine solution has been added, the reaction mixture is then heated to a temperature sufficiently high, depending upon the isocyanate desired to convert the intermediate reaction products to isocyanate. The isocyanate product may then be separated from its solution by fractional distillation or any other suitable method. In some cases it may be desirable to use the isocyanate directly, in the form of a solution.

Instead of a batch process, the reaction may be carried out continuously by draining off solutions from the primary reaction vessel into a secondary reaction vessel at approximately the same rate at which the amine solution is fed into the primary reaction vessel. The solution drawn off from the primary reaction vessel is further reacted with phosgene at a temperature sufficiently high to convert the intermediate reaction products to isocyanate. The solution contained in the secondary reaction vessel is drawn off into a receiving vessel at approximately the same rate at which the amine solution is fed into the primary reaction vessel. The isocyanate product is separated from its solution by fractional distillation or any other suitable method. It is also possible to operate the process semi-continuously, using a continuous flow of reactants and making periodic withdrawals of portions of the isocyanate solution from the secondary reaction vessel.

Almost any primary aromatic amine may be converted to the corresponding isocyanate by this process. The amine may be a monoamine, a diamine or some other polyamine. Examples of aromatic amines which may be used in the practice of this invention are aniline, the isomeric toluidines, the isomeric xylidines, o-, m-, and p-alkylanilines, o-, m-, and p-chloroanilines, the isomeric dichloroanilines, the isomeric phenylenediamines, the isomeric diaminotoluenes, the isomeric diaminoxylenes, various diaminoalkyl benzenes, alpha- and beta-naphthylamines, the isomeric diaminonaphthalenes, the isomeric bisaminophenylmethanes, the isomeric trisaminophenylmethanes, the dianisidines, the diaminodiphenyls and mixtures of these amines. The amine should be free of groups other than the amino group which are capable of reacting with phosgene or the isocyanate radical, i.e., that contain active hydrogen atoms. Such groups are, for example, —OH, —COOH, —SH, etc.

The initial temperatures of phosgenation employed in this invention range from about 60° C. to about 90° C. The preferred temperatures in this range are from 70° C. to 85° C., and if chlorobenzene is used as a solvent, most preferably at a temperature of about 80–85° C.

Atmospheric pressure is normally employed as a matter of convenience, though higher or lower pressure may be used.

The solvents employed in this process are those which are inert to the reactants and products. Although aliphatic and aromatic hydrocarbons which are inert to the reactants and products, have been found to be satisfactory solvents, the preferred solvents are found in the class of chlorinated hydrocarbons. Representative members of this class are monochlorobenzene, o-dichlorobenzene, carbon tetrachloride, the corresponding chlorinated toluenes and xylenes, and trichloroethylene. The most preferred solvents are monochlorobenzene and o-dichlorobenzene. It is desirable and preferable to choose a solvent that boils lower than the isocyanate product.

The amine may be introduced into the reaction vessel in solution in the chlorinated hydrocarbon solvent. Concentrations of the amine may be varied from about 2 to 20% by weight of the solution. The reaction will proceed at lower concentrations; however, lower concentrations result in uneconomically low volume productivities. Higher concentrations of the amine lead to formation of undesirable side products, i.e. substituted ureas, or polyureas due to the reaction between the isocyanate product and the amine. The preferred range of the amine solution is 5 to 10% by weight of amine.

The concentration of phosgene in the reaction solution is regulated by the temperature being employed for the reaction. Preferably, an essentially saturated solution of phosgene in the solvent should be maintained at all times during the reaction. Low concentrations of phosgene result in decreased efficiencies, due to formation of side products. The use of greater amounts of phosgene does not adversely affect the efficiency of the operation. However, precautions must be taken to handle the excess phosgene.

The process of this invention is illustrated by the following representative examples:

Example 1

The apparatus used consisted of a flask equipped with an agitator, an addition funnel whose end dipped beneath the surface of the liquid in the flask, a thermometer, a reflux condenser whose cooling medium was maintained at —10° C. to —15° C. and a phosgene inlet tube which dipped below the liquid surface.

One liter of chlorobenzene was placed in the flask and heated to 80° C. Phosgene was admitted until the solution was saturated (about 90 grams, 0.91 mole). A solution containing 126.1 grams (1.165 moles) of m-phenylenediamine in 1.25 liters of chlorobenzene was maintained at about 75° C. while being added through the addition funnel at a constant rate over a two and one half hour period. During this time an additional 350 g. (3.54 moles) of phosgene was added. Heat was supplied during the addition of the diamine solution so that the temperature of the reaction mixture was maintained at 80° to 85° C. When all the diamine solution had been added, the reaction mixture was heated slowly to reflux. At the end of this period the reaction mixture was allowed to cool, and then filtered to remove any insoluble matter. The chlorobenzene solvent was removed from the filtrate by distillation, leaving m-phenylene diisocyanate in 87% yield.

Example 2

The apparatus and conditions used in Example 1 were repeated with the exception that the initial phosgenation was done at a temperature of 110° C. rather than 80° C. during the addition of the diamine solution. M-phenylenediamine (120.5 grams, 1.115 moles) dissolved in 1.25 liters of chlorobenzene was added over a period of two hours to a saturated solution of phosgene in chlorobenzene maintained at 110° C. During this time an additional 306 grams (3.09 moles) of phosgene was added. When all the diamine solution was added, the reaction mixture was heated slowly to reflux. At the end of this period the reaction mixture was allowed to cool and then filtered to remove any insoluble matter. The chlorobenzene solvent was removed from the filtrate by distillation, leaving m-phenylene diisocyanate in 74% yield.

A comparison of Examples 1 and 2 illustrates the criticalness of the initial phosgenation temperature. Where temperatures higher than the optimum temperature disclosed by this invention are employed, a substantial decrease in yield results.

Example 3

The apparatus used in this example consists of three flasks. Each flask was fitted with a side arm and the flasks were placed in such position to each other that there was a continuous flow of liquid from one to the next. The first and second flasks were designated as the primary and secondary reaction vessel, respectively. The third flask was used to receive the crude solution of isocyanate product. The primary reaction flask was equipped as described in Example 1. The secondary reaction flask was likewise equipped with a phosgene inlet which dipped below the surface of liquid, thermometer, an agitator and a reflux condenser whose cooling medium was maintained at —10° C. to —15° C.

A solution containing 1400 grams (11.45 moles) of 2,4-diaminotoluene in 22.0 liters of chlorobenzene maintained at 65° C. was added over a period of 22.8 hours to the primary reaction flask. The primary reaction flask was maintained at a temperature of about 85° C. while the secondary reaction-flask was maintained at a temperature of about 110° C. Sufficient phosgene was introduced into both reactors to maintain a saturated solution. A total of 5420 grams (54.7 moles) of phosgene was introduced into the primary reaction flask and 1178 grams (11.9 moles) of phosgene was introduced into the secondary reaction flask. After the diamine addition was completed the liquid in the primary reaction flask was heated to reflux as described in Example 1. At the end of this period the liquids were allowed to cool and then filtered to remove any insoluble matter. The chlorobenzene solvent was removed from the filtrate by distillation, leaving 2,4-tolylene diisocyanate in 91% yield.

*Example 4*

The apparatus used in this run was the same as in Example 3.

A stock feed solution consisting of 70%-2,4 tolylene diamine and 30%-2,6 tolylene diamine was prepared by adding 122 parts of mixed diamine to 1107 parts of monochlorobenzene.

The first reactor was charged with 1107 parts of monochlorobenzene and saturated with phosgene at 80° C.

The stock feed solution, preheated to 80° C., was added to the first reactor at a rate of 10 ml./minute while maintaining an excess of phosgene in the reactor. Temperature in the first reactor was maintained at about 80° C.

The overflow from the first reactor passed into the second reactor. The material passing into the second reactor was heated to and maintained at 120° C. The solvent in the second reactor was likewise saturated with phosgene.

A total of 915 parts of mixed diamine was processed.

The crude isocyanate solution resulting was stripped to remove chlorobenzene and vacuum distilled to recover isocyanate.

A yield of 92% based on diamine was obtained.

*Example 5*

The apparatus used was the same as in Example 3. A 4.7 weight percent solution of m-phenylenediamine in chlorobenzene was maintained at 60° C. This solution was added continuously to the primary reaction flask at the rate of 0.42 mole of diamine per hour. Phosgene was introduced into the primary reaction flask at the rate of 2.6 moles per hour. It was found unnecessary to add additional phosgene to the secondary reaction flask since the phosgene dissolved in the reaction liquid flowing from one flask to the other contained sufficient phosgene to complete the reaction. The temperatures of the primary and secondary reaction flasks were maintained at 80° C. and 120° C., respectively. A total of 1983 grams m-phenylene diamine and 12,180 grams of phosgene were added. After the completion of the addition of the diamine solution, the reaction mixture was further processed as described in Example 3. A yield of 91% m-phenylene diisocyanate was obtained.

*Example 6*

The apparatus used was the same as in Example 3. A solution containing 510.4 grams (4.00 moles) of m-chloroaniline in 6.4 liters of trichloroethylene was maintained at 60° C. This solution was added to the primary reaction flask during a period of 4.8 hours. One hundred and forty-one grams (7.48 moles) of phosgene gas was admitted to the primary reaction vessel during the same period of 4.8 hours. It was found unnecessary to add additional phosgene to the secondary reaction flask since the phosgene dissolved in the reaction liquid flowing from one flask to the other contained sufficient phosgene to complete the reaction. The temperatures of the primary and secondary reaction flasks were maintained at 70° and 80° C., respectively.

After the completion of the addition of the amine solution the reaction mixture was further processed as described in Example 3. A yield of 90% m-chlorophenyl isocyanate was obtained.

*Example 7*

The apparatus used was the same as in Example 3. A solution containing 454 grams (1.57 moles) of tris-(4-aminophenyl) methane in 7.9 liters of chlorobenzene was maintained at 80° C. This solution was added to the primary reaction flask at the rate of 0.17 mole of triamine per hour. It was found unnecessary to add additional phosgene to the secondary reaction flask since the phosgene dissolved in the reaction fluid flowing from one flask to the other contained sufficient phosgene to complete the reaction. The temperatures of the primary and secondary reaction flasks were maintained at 85° and 110° C., respectively. After the completion of the addition of the amine solution the reaction mixture was further processed as described in Example 3. A yield of 77% tris-(4-isocyanyophenyl) methane was obtained.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. In a method of preparing aromatic isocyanates by reacting, in an inert organic solvent, a stoichiometric excess of phosgene with a compound selected from the group consisting of aromatic primary mono-, di-, and polyamines having no substituents other than primary amino which are capable of reacting with phosgene under the conditions employed, to form the corresponding isocyanate, the improvement which comprises carrying out the initial phosgenation at a temperature within the range of 60° C. to 90° C. to produce an intermediate product, which contains an admixture of the desired isocyanate and the corresponding intermediate carbamyl chloride, and reacting said intermediate product in the presence of phosgene at a higher temperature to produce the aromatic isocyanate.

2. A method according to claim 1 in which the aromatic primary amine is a diamine.

3. A process according to claim 1 in which the aromatic primary amine is 2,4-tolylene diamine.

4. A process according to claim 1 in which the aromatic primary amine is a mixture of 2,4- and 2,6-tolylene diamines.

5. A process according to claim 1 in which the aromatic primary amine is meta-phenylene diamine.

6. In a method for continuously preparing aromatic isocyanates by reacting phosgene in an inert organic solvent with a compound selected from the group consisting of aromatic primary mono-, di-, and polyamines having no substituents other than primary amino which are capable of reacting with phosgene under the conditions employed, to form the corresponding isocyanate, the improvement which comprises: continuously supplying to a primary reaction zone said inert organic solvent, said amine, and phosgene, more phosgene being introduced than is stoichiometrically the equivalent of the amine being introduced; maintaining a temperature in the range from 60° C. to 90° C. in said primary reaction zone;

maintaining the temperature of said secondary reaction zone above the temperature of said primary reaction zone, and continuously withdrawing from said secondary reaction zone a solution of isocyanate product.

7. A process in accordance with claim 6 in which the aromatic primary amine is a diamine.

8. A process according to claim 6 in which the aromatic primary amine is 2,4-tolylene diamine.

9. A process according to claim 6 in which the aromatic primary amine is a mixture of 2,4-tolylene diamine and 2,6-tolylene diamine.

10. A process according to claim 6 in which the aromatic primary amine is m-phenylene diamine.

11. In a method for preparing 2,4-tolylene diisocyanate by reacting 2,4-tolylene diamine and a stoichiometric excess of phosgene in chlorobenzene solution to form the diisocyanate, the improvement which comprises carrying out the initial phosgenation, at a temperature within the range of about 80-85° C. to produce an intermediate product, which contains an admixture of the desired isocyanate and the corresponding intermediate carbamyl chloride, and reacting said intermediate product in the presence of phosgene at a temperature of about 110-115° C. to produce 2,4-tolylene diisocyanate.

12. A continuous process for the manufacture of 2,4-tolylene diisocyanate which comprises; continuously supplying phosgene and a chlorobenzene solution of 2,4-tolylene diamine containing from 2 to 20% diamine to a primary reaction zone, said phosgene and said diamine being supplied in a molar ratio of greater than 2; maintaining the temperature in said primary reaction zone at about 80 to 85° C.; continuously withdrawing liquid from said primary reaction zone to a secondary reaction zone; maintaining the temperature of said secondary reaction zone at about 110-115° C.; and continuously withdrawing a chlorobenzene solution of 2,4-tolylene diisocyanate from said secondary reaction zone.

13. A process of preparing a mixture of 2,4- and 2,6-tolylene diisocyanates which comprises: continuously supplying phosgene and a chlorobenzene solution of a mixture of 2,4- and 2,6-tolylene diamines containing between 2 and 20% diamines to a primary reaction zone, said phosgene and said diamine mixture being supplied in a molar ratio greater than 2; maintaining the temperature in said primary reaction zone at about 80-85° C.; continuously withdrawing liquid from said primary reaction zone to a secondary reaction zone; continuously supplying phosgene to said secondary reaction zone; maintaining the temperature of said secondary reaction zone at about 110-115° C.; and withdrawing from said secondary reaction zone a chlorobenzene solution of mixed 2,4- and 2,6-tolylene diisocyanates.

References Cited in the file of this patent

UNITED STATES PATENTS

| 2,625,561 | Werntz | Jan. 13, 1953 |
| 2,680,127 | Slocombe et al. | June 1, 1954 |
| 2,680,129 | Flores | June 1, 1954 |
| 2,680,130 | Flores | June 1, 1954 |
| 2,689,861 | Thompson | Sept. 21, 1954 |
| 2,824,117 | Gemassmer | Feb. 18, 1958 |

FOREIGN PATENTS

| 566,532 | Great Britain | Jan. 3, 1945 |
| 926,845 | Germany | Apr. 25, 1955 |